(12) United States Patent
Murakami

(10) Patent No.: US 6,954,588 B2
(45) Date of Patent: Oct. 11, 2005

(54) CAMERA

(75) Inventor: Taro Murakami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/694,303

(22) Filed: Oct. 27, 2003

(65) Prior Publication Data

US 2005/0089320 A1 Apr. 28, 2005

(30) Foreign Application Priority Data

Oct. 28, 2002 (JP) ........................................ 2002/313118

(51) Int. Cl.[7] ............................................. G03B 13/10
(52) U.S. Cl. ............................ 396/84; 396/85; 396/379
(58) Field of Search ............................. 396/84–87, 379

(56) References Cited

U.S. PATENT DOCUMENTS 5,659,810 A * 8/1997 Nomura et al. ............... 396/72
5,892,989 A * 4/1999 Kawasaki et al. ............. 396/87
5,950,021 A * 9/1999 Suzuki et al. ................. 396/87
6,381,412 B1 * 4/2002 Ishito et al. ................... 396/60

FOREIGN PATENT DOCUMENTS

JP   H7(1995)-174954   7/1995   ............ G02B/7/02

* cited by examiner

Primary Examiner—W. B. Perkey
(74) Attorney, Agent, or Firm—Cowan, Liebowitz & Latman, P.C.

(57) ABSTRACT

A camera can reduce thickness of a driving member in the diameter direction is disclosed. The camera comprises an actuator, a driven unit and a driving member that rotates around the image-taking optical axis by the driving force from the actuator and transmits the driving force to the driven unit. Herein, two gears are formed integrally on the outer and inner circumferences of the driving member, and of these two gears, a first gear is interconnected to the actuator and a second gear is interconnected to the driven unit, and the two gears are formed at different positions in the direction of the image-taking optical axis in the driving member.

4 Claims, 17 Drawing Sheets

CAMERA

BACKGROUND OF THE INVENTION

1. Field of the Invention

The present invention relates to a camera comprising a drive ring rotatable around an image-taking optical axis, which drives a lens member and a driven unit by rotation of the drive ring.

2. Description of the Related Art

In conventional methods, in order to allow the lens barrel of a camera to advance and retract in the direction of the image-taking optical axis, a driving force from an actuator such as a motor is transmitted by a gear etc., to a rotating member arranged outside the lens barrel, a lens holding member that holds an image-taking lens is moved in the direction of the image-taking optical axis by rotation of the rotating member around the image-taking optical axis. Herein, the rotating member and the lens holding member are engaged by cams and helicoids, etc., and the lens holding member can be moved in the direction of the image-taking optical axis in response to the rotation of the rotating member in a state where the lens holding member is prevented from rotating.

On the other hand, a camera is available that is provided with an inner circumferential gear inside a rotating member so as to reduce the size of a lens barrel. In the lens barrel disclosed in Japanese Patent Application Laid-Open No. H7(1995)-174954, a helical inner circumferential gear is formed on a rotating member.

In the structure of the above-mentioned lens barrel, the rotating maker needs to receive a driving force from an actuator so that the lens holding member is moved in the direction of the image-taking optical axis by the rotation of the rotating member around the image-taking optical axis. For this purpose, gear portion that engage with gears interconnected to an actuator must be formed on the rotating member.

In addition, in case that the lens holding member (image-taking lens) is allowed to move together with a lens constituting a finder optical system arranged outside the lens barrel by the rotation of the rotating member, it is necessary to transmit the rotational force of the rotating member to a finder unit having the finder optical system through a gear train. Therefore, it is necessary to form gear portion which engage with gears interconnected to the finder unit on the rotating member.

Herein, in case that an inner circumferential gear portion for receiving a driving force from the actuator is formed on the inner surface of the cylindrically-shaped rotating, it is necessary to make the thickness of the rotating member (thickness in the diameter direction of the rotating member) greater than in a case where an inner circumferential gear portion is not formed, in order to secure the strength of the rotating member. Further, in case that an outer circumferential gear portion for transmitting a driving force to the finder unit is formed on the outer surface of the rotating member, the thickness of the rotating member must be great.

In addition, in case that the inner circumferential gear portion and the outer circumferential gear portion are formed within the plane orthogonal to the image-taking optical axis, the thickness of the rotating member must be greater still.

As explained above, a greater thickness of the rotating member results in an increased size of the rotating member in the diameter direction, thereby resulting in an increased size of a lens barrel and a camera provided with the lens barrel. Further, in case that the outer circumferential gear portion of the rotating member is interconnected to the finder unit, the finder unit is kept away from the lens barrel by a distance of the increased thickness of the rotating member, thus making the distance between an image-taking optical axis and a finder optical axis longer, which then results in a greater parallax.

SUMMARY OF THE INVENTION

One aspect of the camera of the present invention comprises an actuator, a driven unit and a driving member that rotates around an image-taking optical axis by the driving force from the actuator and transmits the driving power to the driven unit. Herein, two gears are formed integrally in the outer and inner circumferences of the driving member, of these two gears, a first gear is interconnected to the actuator and a second gear is interconnected to the driven unit, and these two gears are formed at different positions in the direction of the image-taking optical axis in the driving member.

The features of the camera of the present invention will become more apparent by reference to the following detailed description of the preferred embodiments taken in conjunction with the accompanying drawings.

DETAILED DESCRIPTION OF THE PREFERRED EMBODIMENT

Figure 17A:
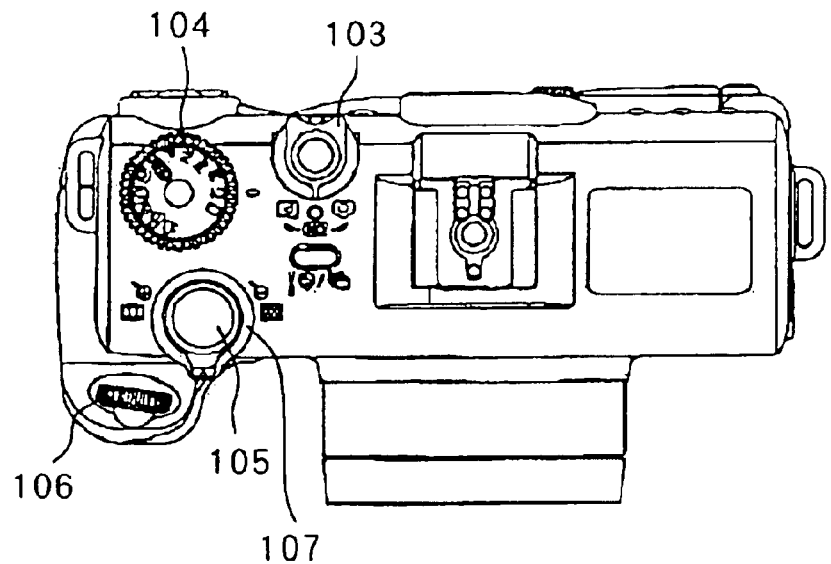
FIG. 17(A) and (B) are a top view and a front view of the electric camera of an embodiment of the present invention respectively.

A camera which is an embodiment of the present invention will be explained. FIG. 17 shows an external view of a camera which is this embodiment. In FIG. 17A is a top view of a camera and FIG. 1B is a front view of the camera.

Figure 17B:
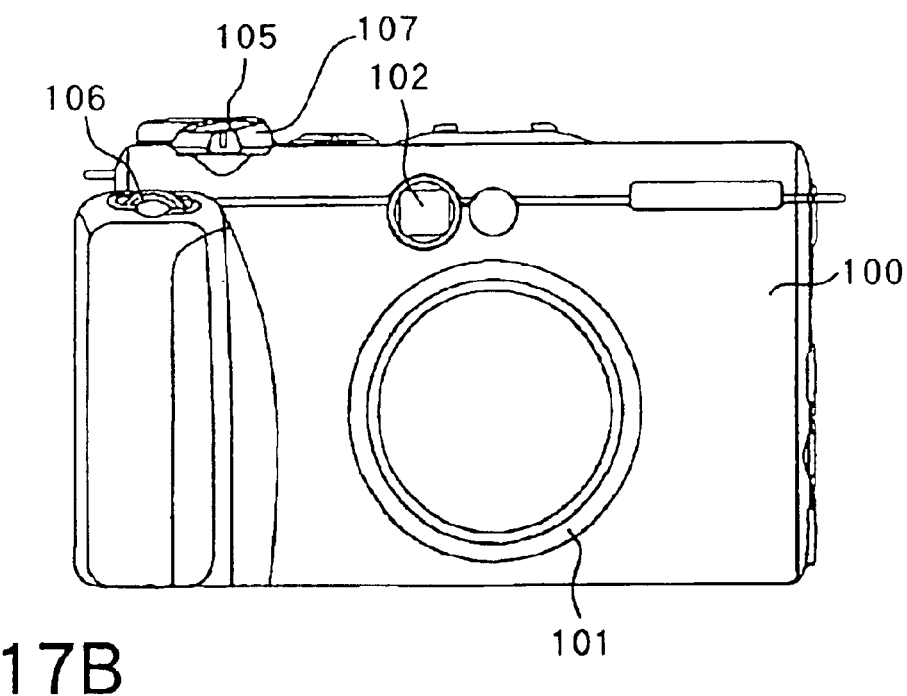

In FIGS. 17A and 17B, a lens barrel 101 is provided substantially at the center viewed from the front of a camera body 100 and a finder 102 is provided at the upper left of the lens barrel 101. Reference numeral 103 denotes a power switch, which sets a replay mode (mode to replay and display a captured image) when turned clockwise in FIG. 17A and sets an image-taking mode when turned counterclockwise in FIG. 17A.

Reference numeral 104 denotes a mode dial, which is a dial to select various image-taking modes. Reference numeral 105 denotes a release button, on the circumference of which a zoom key 107 is provided in a manner rotatable with respect to the camera body 100 and it is possible to change the focal length of the image-taking optical system to the telephoto side or wide-angle side according to the rotation direction of the zoom key 107. Reference numeral 106 denotes an electronic dial, which allows, when turned, various operations such as changing an aperture value or shutter speed.

Figure 1:
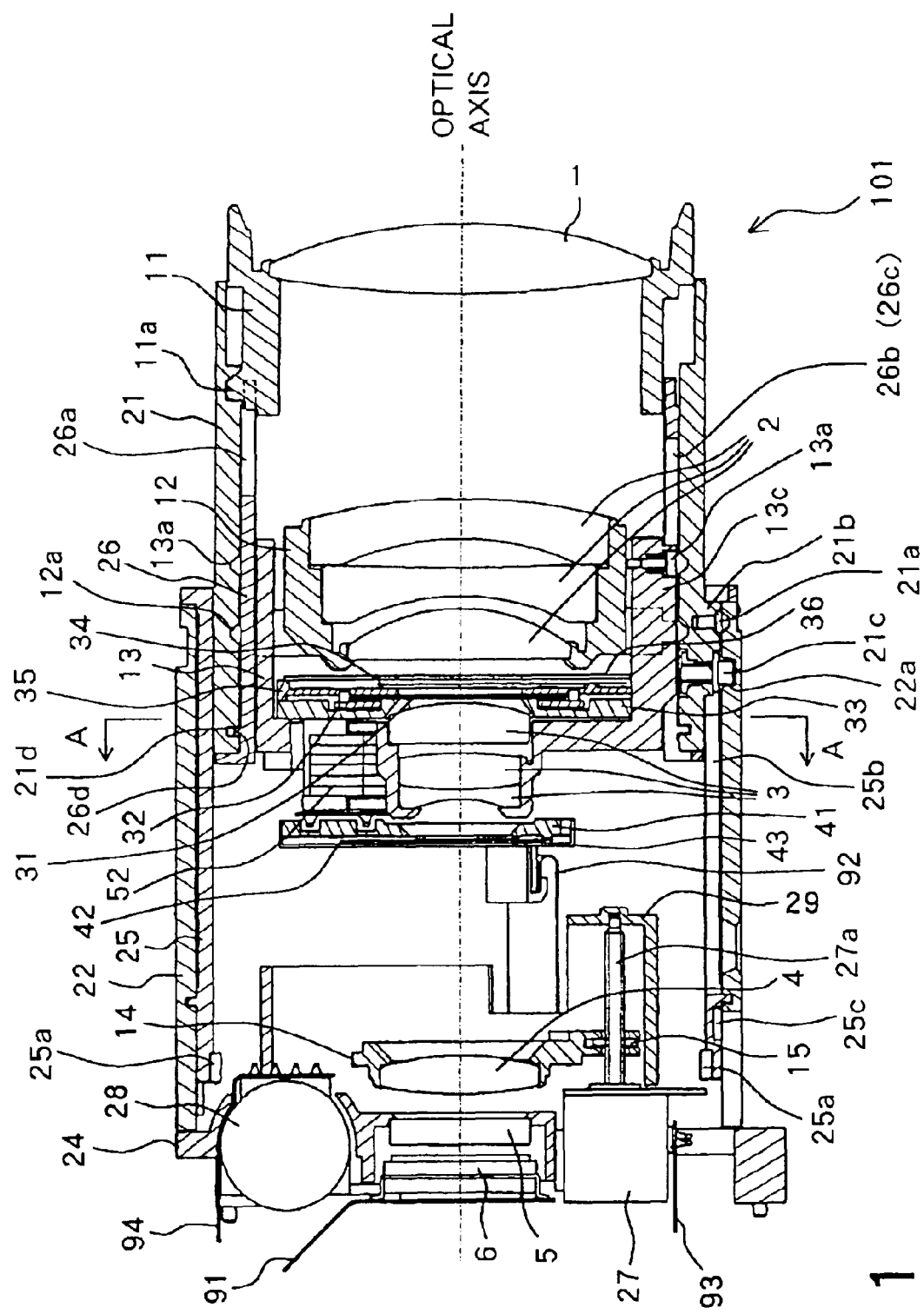
FIG. 1 is a sectional view of a lens barrel.

A lens barrel 101 in a camera of an embodiment of the present invention will be explained. FIG. 1 shows a sectional view of the lens barrel 101 (sectional view of the plane including the image-taking optical axis). The lens barrel 101 will be mounted to the camera body 100 mentioned above.

In FIG. 1, reference numerals 1, 2 and 3 denote a first lens, a second lens unit and a third lens unit respectively, which move in the direction of the image-taking optical axis to perform a variable power operation. Reference numeral 4 denotes a fourth lens which is responsible for focusing and image plane correction, 5 denotes a low pass filter and 6 denotes an image pickup element (CCD or CMOS sensor, etc.) arranged on the image forming plane of a light flux from an object.

Reference numerals 11, 12, 13 and 14 denote a first holding barrel, a second holding barrel, a third holding barrel and a fourth holding barrel which hold the lenses 1 to 4 respectively. The first holding barr 1 11, second holding barrel 12 and third holding barrel 13 are arranged inside a movable cam ring 21 and engage with cam groove portions formed in the inner surface of the movable cam ring 21.

Reference numeral 22 denotes a fixed barrel and the movable cam ring 21 engages with a cam groove portion formed in the inner surface thereof. The movable cam ring 21 is movable in the direction of the image-taking optical axis through the engagement with the cam groove portion of the fixed barrel 22. Reference numeral 24 denotes a holder to which the fixed barrel 22 is fixed. The holder 24 holds the low pass filter 5 and the image pickup element 6.

Reference numeral 25 denotes a driving ring which rotates the movable cam ring 21 around the image-taking optical axis. Reference numeral 26 denotes a rectilinear propagation guide ring which blocks the rotation of the first holding barrel 11, second holding barrel 12 and third holding barrel 13 around the image-taking optical axis and moves these holding barrels 11 to 13 in the direction of the image-taking optical axis. Reference numeral 27 denotes a focus motor which drives the fourth holding barrel 14, 28 denotes a zoom motor which drives the driving ring 25 and these motors 27 and 28 are fixed to the holder 24.

Reference numeral 91 denotes a flexible printed wiring board (hereinafter referred to as "FPC") which transmits an output signal (image-data) of the image pickup element 6 to the camera body side. A signal processing circuit (not shown) provided on the camera body side receives an image data from the image pickup element 6 through the FPC 91, performs predetermined processing (for example, color processing) and then sends the image data to a display section provided in the camera body and displays this image on the display section or records it in a recording medium housed in the camera body.

Reference numeral 92 denotes an FPC which transmits a driving signal from the camera body 100 side to the stop shutter unit and the ND unit. Reference numerals 93 and 94 denote FPCs which supply power to the focus motor 27 and the zoom motor 28, respectively.

The operation of the lens barrel 101 with the above described structure will be explained. In a camera of this embodiment, when power is OFF, the lens barrel 101 is housed inside the camera body 100 (in a collapse state). When power is turned ON, the lens barrel moves in the direction of the image-taking optical axis from the collapse state into an image-taking state. In the image-taking state, it is possible to perform a zooming operation of the image-taking optical system by moving the lens barrel forward or backward in the direction of the image-taking optical axis.

Figure 9:
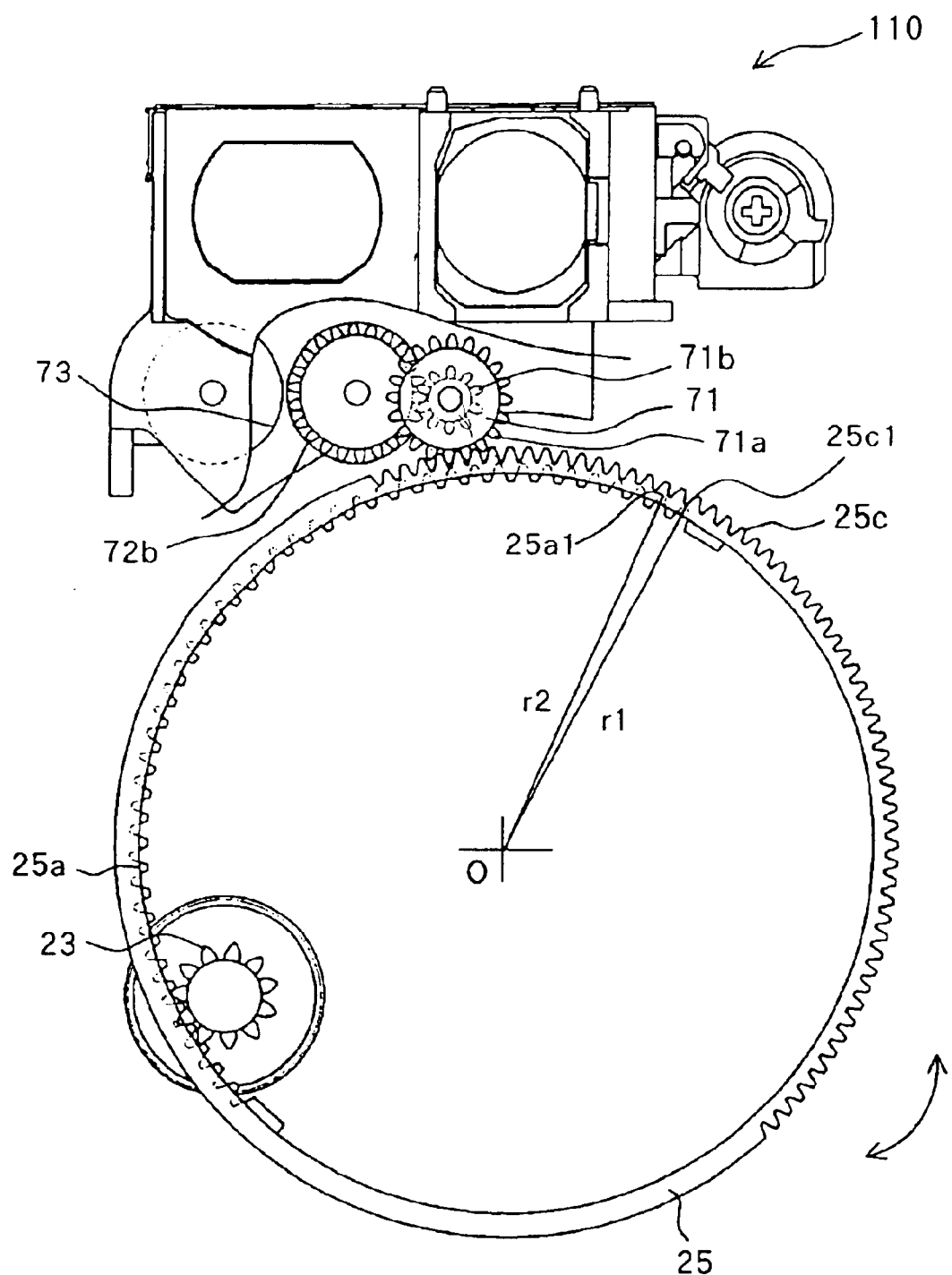
FIG. 9 is a figure showing a mechanism interconnects a driving ring and a finder unit.

FIG. 9 shows a mechanism interconnecting a driving ring 25 and a finder unit 110. A driving force of the zoom motor 28 is transmitted to a driving gear 23 through a gear system (not shown). Herein since the driving gear 23 engages with an inner circumferential gear portion (the first gear portion) 25a formed on the inner surface of the driving ring (driving maker) 25, the driving ring 25 rotates around the image-taking optical axis (in the direction shown by the arrow in FIG. 9) under the influence of the driving force from a motor 28.

An outer circumferential gear portion (the second gear portion) 25c is formed on the outer surface of the driving ring 25, and the outer circumferential gear portion 25c is at a position deviated from the inner circumferential gear portion 25a in the direction of the image-taking optical axis (on the end side of the lens barrel 101 in FIG. 1). Further, as shown in FIG. 9, the outer circumferential gear portion 25c and the inner circumferential gear portion 25a are formed so that the distance r1 between an image-taking optical axis O and a bottom 25c1 of the outer circumferential gear portion 25c is equal to or shorter than the distance r2 between the image-taking optical axis O and a bottom 25a1 of the inner circumferential gear portion 25a.

As explained above, the outer circumferential gear portion (second gear) 25c and the inner circumferential gear portion (first gear) 25a are formed at a different position in the direction of the image-taking optical axis on the driving ring 25 so as to make the distance r1 equal to or shorter than the distance r2, thereby making it possible to set the thickness of the driving ring 25 (thickness of the driving ring 25 in the diameter direction) to such a degree that allows one gear portion (outer circumferential gear portion 25c or inner circumferential gear portion 25a) to be formed and reduce the thickness of the driving ring 25 compared to a case where two gear portions 25c and 25a are formed at the same positions (in the plane orthogonal to the image-taking optical axis) in the direction of the image-taking optical axis.

Herein, deviating the two gear portions 25a and 25c from each other in the direction of the image-taking optical axis makes it possible to substantially equalize a pitch circle diameters of the inner circumferential gear portion 25a and the outer circumferential gear portion 25c irrespective of the thickness of the driving ring 25 or increase either one of the two gear portions 25a or 25c depending on the thickness of the driving ring 25 and the module setting of the gear portions 25a and 25c.

The outer circumferential gear portion 25c engages with a large gear portion 71a of the reduction gear 71 interconnected to the finder unit 110 and when the driving ring 25 rotates around the image-taking optical axis, this rotational force is transmitted to the finder unit 110 through the reduction gear 71. In the finder unit 110, the transmitted force allows zooming in the finder optical system.

The driving ring 25 is provided with three rectilinear propagation guide groove portions 25b which extend in the direction of the image-taking optical axis with a uniform width. Three cam followers 21a are provided on the external surface of the movable cam ring 21 (showing one of these cam followers 21a in FIG. 1). These cam followers 21a engage with the three inner cam groove portions formed on the inner surface of the fixed barrel 22 respectively. The cam followers 21a move along the inner cam groove portions of the fixed barrel 22 respectively, according to the rotation of the driving ring 25 around the image-taking optical axis. In this way, the movable cam ring 21 rotates around the image-taking optical axis.

A guide portion 21b formed integral with the movable cam ring 21 is provided in the vicinity of the cam followers 21a and the guide portion 21b engages with the rectilinear propagation guide groove portion 25b of the driving ring 25 in a slidable manner.

When the driving ring 25 receives a driving force from the zoom motor 28 and rotates around the image-taking optical axis, the movable cam ring 21 rotates around the image-taking optical axis through the engagement between the rectilinear propagation guide groove portion 25b and the guide portion 21b. As shown above, when the movable cam ring 21 rotates around the image-taking optical axis, the cam followers 21a move along the inner cam groove portions of the fixed barrel 22, and therefore the movable cam ring 21 moves in the direction of the image-taking optical axis while rotating around the image-taking optical axis.

On the other hand, in the movable cam ring 21, a pin 21c is provided in the vicinity of the cam followers 21a and the pin 21c is fitted in a groove portion 22a formed on the inner surface of the fixed barrel 22 with a certain gap. In this structure, when the lens barrel 101 receives external shock, the pin 21c contacts the end surface of the groove portion 22a and absorbs the shock and thereby prevents the cam followers 21a from disengaging from the inner cam groove portions of the fixed barrel 22.

A guide groove portion 21d having a uniform width is formed on the circumference of the inner surface of the movable cam ring 21 and a projection 26d provided on the external surface of the rectilinear propagation guide ring 26 engages with the guide groove portion 21d in a slidable manner. This causes the rectilinear propagation guide ring 26 to slide in response to the rotation of the movable cam ring 21.

The rectilinear propagation guide ring 26 is prevented from rotating around the image-taking optical axis by rotation prevention keys 61 and 62 (see FIG. 8) which extend in the direction of the image-taking optical axis and is movable only in the direction of the image-taking optical axis. For this reason, when the movable cam ring 21 moves in the direction of the image-taking optical axis while rotating around the image-taking optical axis, the rectilinear propagation guide ring 26 only moves in the direction of the image-taking optical axis without rotating around the image-taking optical axis.

Cam followers 11a, 12a and 13a formed on the external surface of the first holding barrel 11, second holding barrel 12 and third holding barrel 13 respectively engage with the cam groove portions formed on the inner surface of the movable cam ring 21.

Here, the cam followers 11a are formed integral with the external surface of the first holding barrel 11 and are provided at three locations in the circumferential direction of the first holding barrel 11. The cam followers 12a are formed integral with the external surface of the second holding barrel 12 and consist of cam followers provided at two locations in the circumferential direction of the second holding barrel 12 and a movable cam follower pressed against the cam groove portion of the movable cam ring 21 by means of a spring force. The cam followers 13a is formed integral with the external surface of the third holding barrel 13 and consists of cam follower provided at two locations in the circumferential direction of the third holding barrel 13 and a movable cam follower pressed against the cam groove portion of the movable cam ring 21 by means of a spring force.

Rectilinear propagation guide groove portions 26a, 26b and 26c extending in the direction of the image-taking optical axis with a predetermined width are formed in the rectilinear propagation guide ring 26. Part of the first holding barrel 11, part of the second holding barrel 12 and a rib 13c formed on the third holding barrel 13 engage with these rectilinear propagation guide groove portions 26a, 26b and 26c respectively in a slidable manner.

As described above, since part of the first holding barrel 11, part of the second holding barrel 12 and the rib 13c of the third holding barrel 13 engage with these rectilinear propagation guide groove portions 26a, 26b and 26c extending in the direction of the image-taking optical axis respectively, the holding barrels 11, 12 and 13 do not rotate around the image-taking optical axis but can move only in the direction of the image-taking optical axis. Then, the holding barrels 11, 12 and 13 move in the direction of the image-taking optical axis through the engagement between the cam followers 11a, 12a, 13a and the cam groove portions of the movable cam ring 21. This structure allows the first lens 1, second lens unit 2 and third lens unit 3 to move to a position according to a desired focal length.

In this embodiment, the cam followers 11a have a plane perpendicular to the image-taking optical axis. Furthermore, as shown in the inner exploded view of the movable cam ring 21 in FIG. 2, the cam groove portions 21f of the movable cam ring 21 which engages with the cam followers 11a has no gradient between the WIDE position and the TELE position. When the lens barrel is in a state capable of image-taking (between the WIDE state and TELE state), the above described structure prevents the cam followers 11a from coming off the cam groove portions 21f when external shock is added to the lens barrel by the cam followers 11a contacting the cam groove portions 21f.

Figure 2:
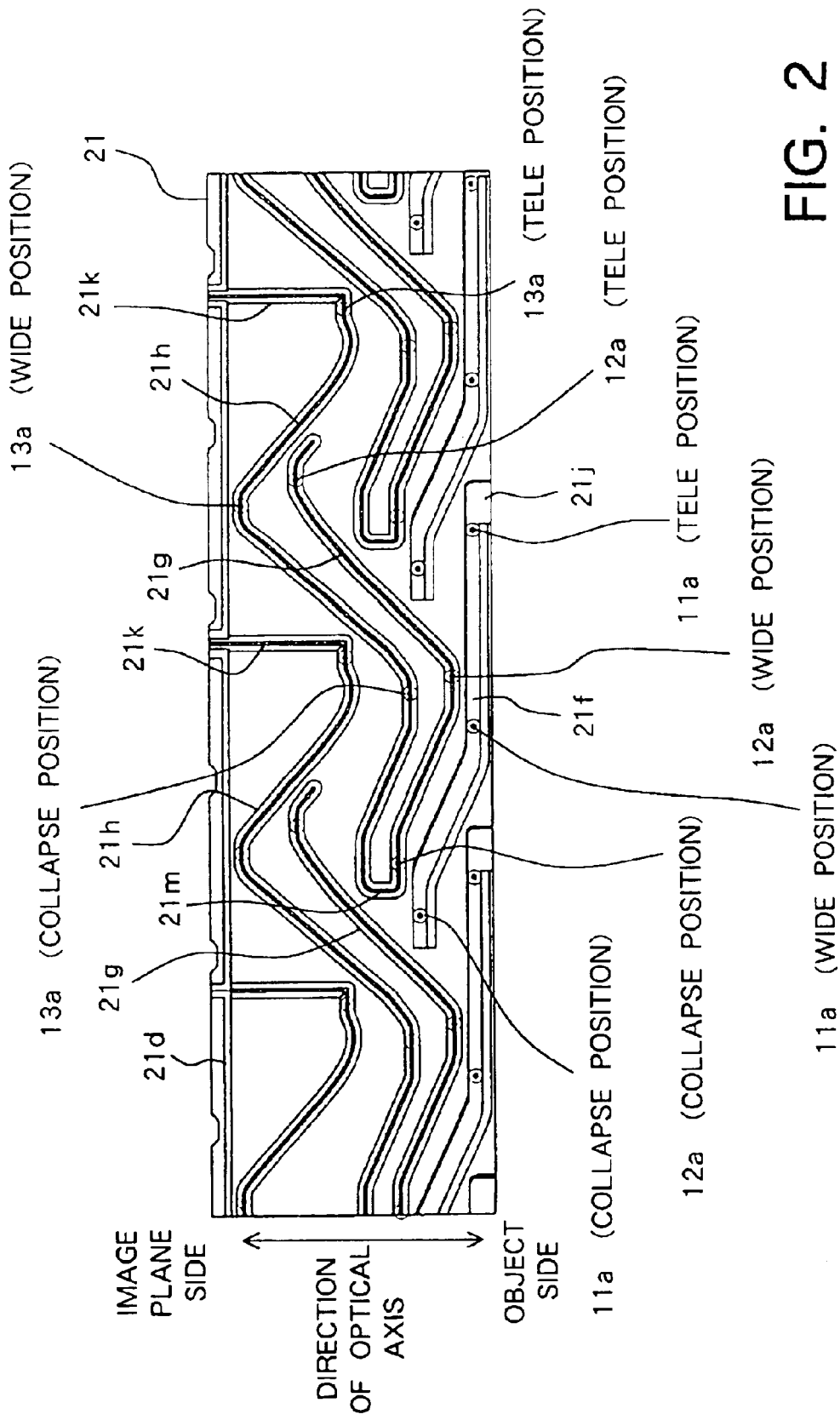
FIG. 2 is an inner development view of a movable cam ring.

In FIG. 2, referenc numerals 21f, 21g and 21h denote cam groove portions with which the cam followers 11a, 12a and 13a of the first holding barrel 11, second holding barrel 12 and third holding barrel 13 engage respectively.

Reference numerals 21j and 21k denote guide groove portions which guide the cam followers 11a, 12a and 13a into the cam groove portions 21f, 21g and 21h when the lens barrel is assembled. Reference numeral 21m denotes a coupling groove portion which couples the cam groove portion 21g with the cam groove portion 21h. The cam groove portions 21f, 21g and 21h are formed on the circumference of the inner surface of the movable cam ring 21 according to the number (three in this embodiment) of cam followers.

As described above, since one of the cam followers 12a and 13a (including three cam followers) is a movable cam follower energized by means of a spring, it can stabilize the driving loads of the second holding barrel 12 and third holding barrel 13, eliminate play between the cam groove portions 21g and 21h, and the cam followers 12a and 13a to prevent the lens units 2 and 3 from decentering with respect to the image-taking optical axis.

In this embodiment, the amount of movement of the second holding barrel 12 and third holding barrel 13 in the direction of the image-taking optical axis is large, that is the length of the cam groove portions 21g and 21h in the direction of the image-taking optical axis (crosswise direction in FIG. 2) is long. Thereby, to reduce the size of the movable cam ring 21 (lens barrel 101) in the direction of the image-taking optical axis, the cam groove portion 21g and cam groove portion 21h need to be arranged close to each other as shown in FIG. 2.

In this way, arranging the cam groove portion 21g and cam groove portion 21h close to each other eliminates the area in the movable cam ring 21 for forming a guide groove portion to guide the cam follower 12a of the second holding barrel 12 into the cam groove portion 21g when the lens barrel is assembled. Furthermore, when the first holding barrel 11, second holding barrel 12 and third holding barrel 13 are incorporated in the movable cam ring 21, attempting to incorporate the first holding barrel 11 from the same direction as that in which the second holding barrel 12 and third holding barrel 13 are incorporated eliminates the area for forming the guide groove portions to guide the cam followers 11a of the first holding barrel 11 into the cam groove portions 21f.

In this embodiment, as shown in FIG. 2, the guide groove portions for the first holding barrel 11 (cam followers 11a) are formed at one end (object side) of the movable cam ring 21 and the guide groove portions for the second holding barrel 12 (cam followers 12a) and third holding barrel 13 (cam followers 13a) are formed at the other end (image plane side) of the movable cam ring 21, therefore the second holding barrel 12 and the third holding barrel 13 are incorporated into the movable cam ring 21 from a direction different from the direction in which the first holding barrel 11 is incorporated into the movable cam ring 21.

In correspondence with the above described incorporation directions, the rectilinear propagation guide groove portion 26a is formed up to one end (end on the object side) of the rectilinear propagation guide ring 26 and the rectilinear propagation guide groove portions 26b and 26c are formed up to the other end (end on the image plane side) of the rectilinear propagation guide ring 26. This allows the first holding barrel 11 to be incorporated from the one end of the rectilinear propagation guide ring 26 and the second holding barrel 12 and the third holding barrel 13 to be incorporated from the other end of the rectilinear propagation guide ring 26.

Furthermore, the cam groove portion 21g and cam groove portion 21h are interconnected by the coupling groove portion 21m and the second holding barrel 12 and the third holding barrel 13 are incorporated from one guide groove portion 21k into the movable cam ring 21. That is, when the second holding barrel 12 and the third holding barrel 13 are incorporated into the movable cam ring 21, the cam follower 12a of the second holding barrel 12 is first allowed to pass through the cam groove portion 21h and coupling groove portion 21m and then guided into the cam groove portion 21g and thereby the second holding barrel 12 is incorporated in the movable cam ring 21. Then, the cam follower 13a of the third holding barrel 13 is introduc d into the cam groove portion 21h and thereby the third holding barrel 13 is incorporated into the movable cam ring 21.

As described above, by adopting a structure capable of forming the cam groove portion 21h and the cam groove portion 21g close to each other and incorporating the holding barrels 11, 12 and 13 from both ends of the movable cam ring 21, it is possible to reduce the diameter of the movable cam ring 21 (lens barrel 101) and the length in the direction of the image-taking optical axis.

Then, the driving mechanism of the fourth lens 4 which performs a focusing operation by moving in the direction of the image-taking optical axis will be explained.

In FIG. 1, the fourth holding barrel 14 which holds the fourth lens 4 is supported by a main guide bar (not shown) arranged in parallel to the image-taking optical axis and is movable along this main guide bar. Furthermore, a sub-guide bar is arranged in parallel to the image-taking optical axis on the substantially opposite side of the main guide bar across the image-taking optical axis and a rotation stopper provided on the external surface of the fourth holding barrel 14 engages with the sub-guide bar in a slidable manner.

A nut bearing portion whose cross section is horseshoe-shaped is provided in the vicinity of the main guide bar of the fourth holding barrel 14, and this nut bearing portion is provided with a nut 15 which engages with a lead screw portion 27a of the focus motor 27. The rotation of the nut 15 is blocked by a rotation stopper (not shown), and therefore when the focus motor 27 (lead screw portion 27a) rotates, the nut 15 moves along the lead screw portion 27a. This allows the fourth holding barrel 14 (fourth lens 4) to move in the direction of the image-taking optical axis and stop at a predetermined in-focus position.

The one ends of the above described main guide bar and sub-guide bar are fixed to a holder 24 and the other ends are fixed to a fourth cap 29. Furthermore, the end of the lead screw portion 27a of the focus motor 27 is fixed to the fourth cap 29.

Then, the structure of the stop shutter unit and ND unit will be explained.

In FIG. 1, reference numeral 31 denotes a stop blade, 32 denotes a pinwheel which drives the stop blade 31, 33 denotes a stop base plate. Reference numeral 34 denotes a shutter blade, 35 denotes a shutter base plate, 36 denotes a shutter cover and 52 denotes a shutter yoke. The stop shutter unit is made up of these members. Reference numeral 41 denotes an ND base plate, 42 denotes an ND blade and 43 denotes an ND cover. The ND unit is made up of these members.

The structure of the stop shutter unit will be explained using FIGS. 3, 4 and 5.

Figure 3:
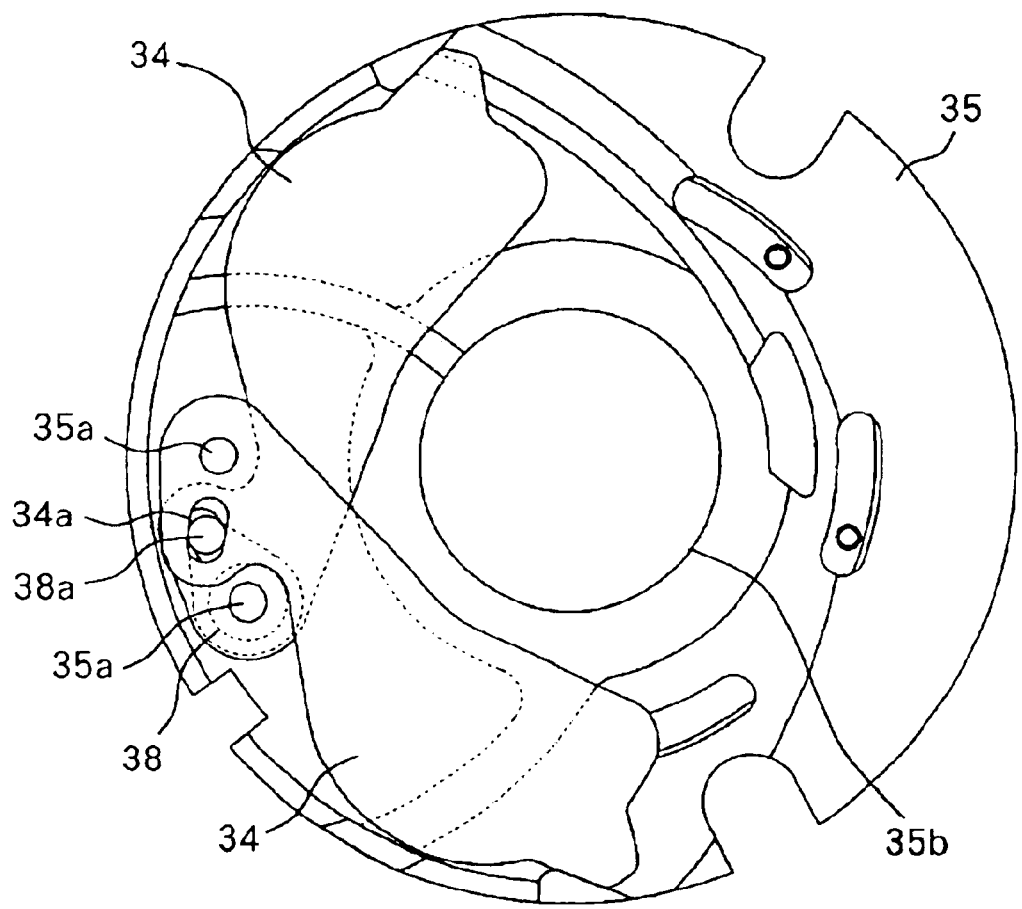
FIG. 3 is a front view of a stop shutter unlit in a state where a shutter cover is removed.

FIG. 3 is a front view of the stop shutter unit when the shutter cover 36 is removed. FIG. 3 shows the state in which the two shutter blades 34 have moved away from the opening 35b serving as a hole portion for light passage formed in the shutter base plate 35.

Each shutter blade 34 is supported to the rotation shaft 35a formed on the shutter base plate 35 in a rotatable manner and a driving pin 38a formed at the end of the driving lever 38 (shown by a dotted line in FIG. 3) engages with a long hole portion 34a formed at the end (rotation shaft side) of each shutter blade 34. The driving lever 38 receives a driving force from a driving unit which will be described later and can rotate and through this rotation, each shutter blade 34 rotates around each rotation shaft 35a. In this way, the two shutter blades 34 open/close the opening 35b.

Figure 4:
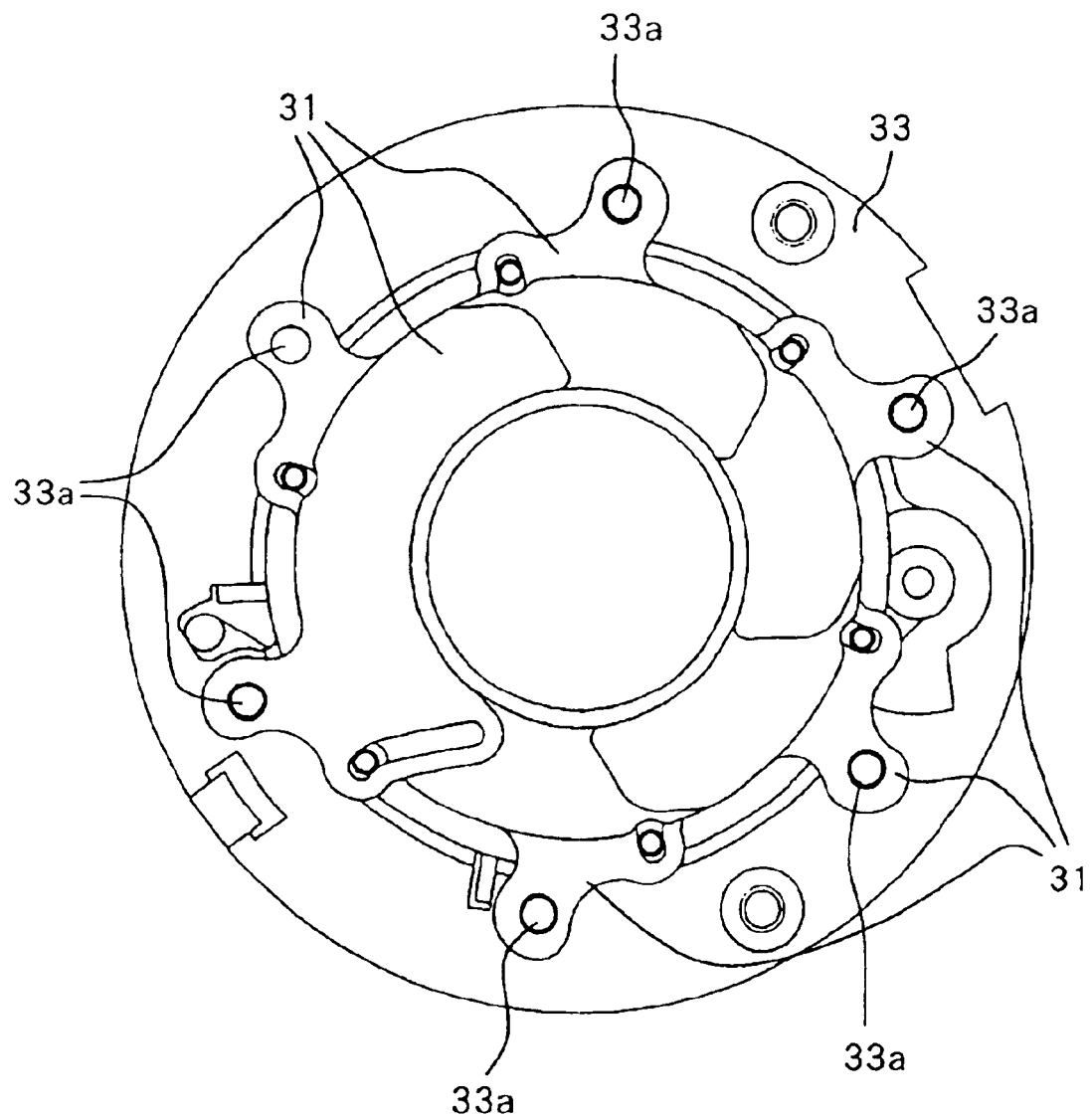
FIG. 4 is a front view of the stop shutter unit in a state where a shutter base plate is removed from the state shown in FIG. 3.

FIG. 4 is a front view of the stop shutter unit when shutter blades 34 and shutter base plate 35 are removed from the state shown in FIG. 3. In FIG. 4, six stop blades 31 of the same shape are supported to the rotation shafts 33a formed on the stop base plate 33 in a rotatable manner.

Figure 5:
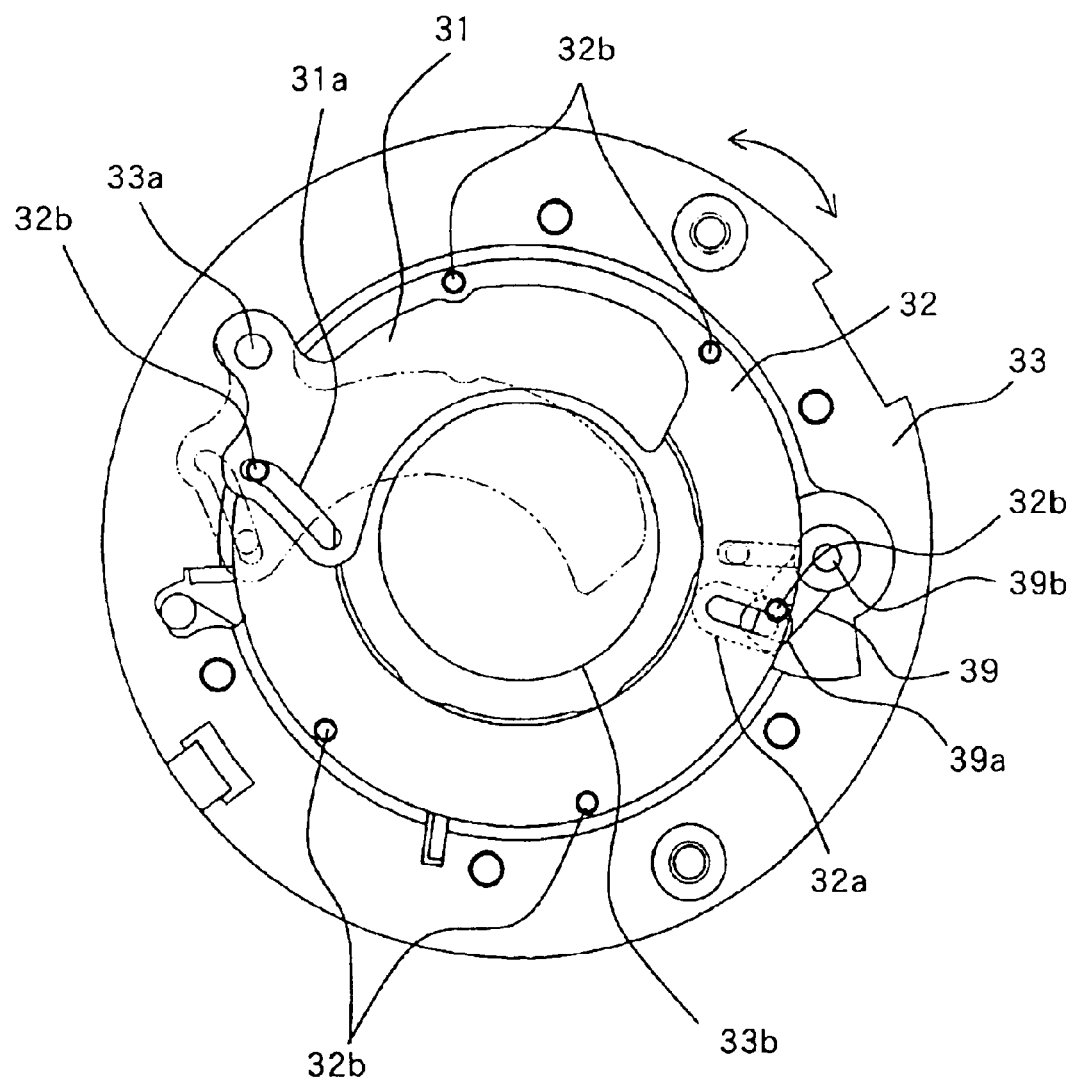
FIG. 5 is a front view of the stop shutter unit in a state where five stop blades are removed from the state shown in FIG. 4.

FIG. 5 is a front view of the stop shutter unit when the five stop blades 31 are removed from the state shown in FIG. 4. In FIG. 5, reference numeral 39 denotes a driving lever which drives (rotates) a pinwheel 32 and is rotatable around a shaft 39b. A pin 39a is provided at the end of the driving lever 39 and the pin 39a engages with a long hole portion (shown with a dotted line in FIG. 5) 32a formed on the back of the pinwheel 32.

When the driving lever 39 rotates, the pinwheel 32 rotates around the image-taking optical axis (direction shown by an arrow in the figure) through the engagement between the pin 39a and long hole portion 32a. Six pins 32b are formed on the pinwheel 32 and these pins 32b engage with the cam groove portions 31a formed in the stop blades 31.

In the above described structure, when the pinwheel 32 rotates, the stop blades 31 rotate around the rotation shafts 33a through the cam engagement between the pin 32b and cam groove portion 31a and move forward or backward to/from the opening 33b formed in the stop base plate 33. This operation changes the area of the opening of light passage (aperture diameter).

Figure 6:
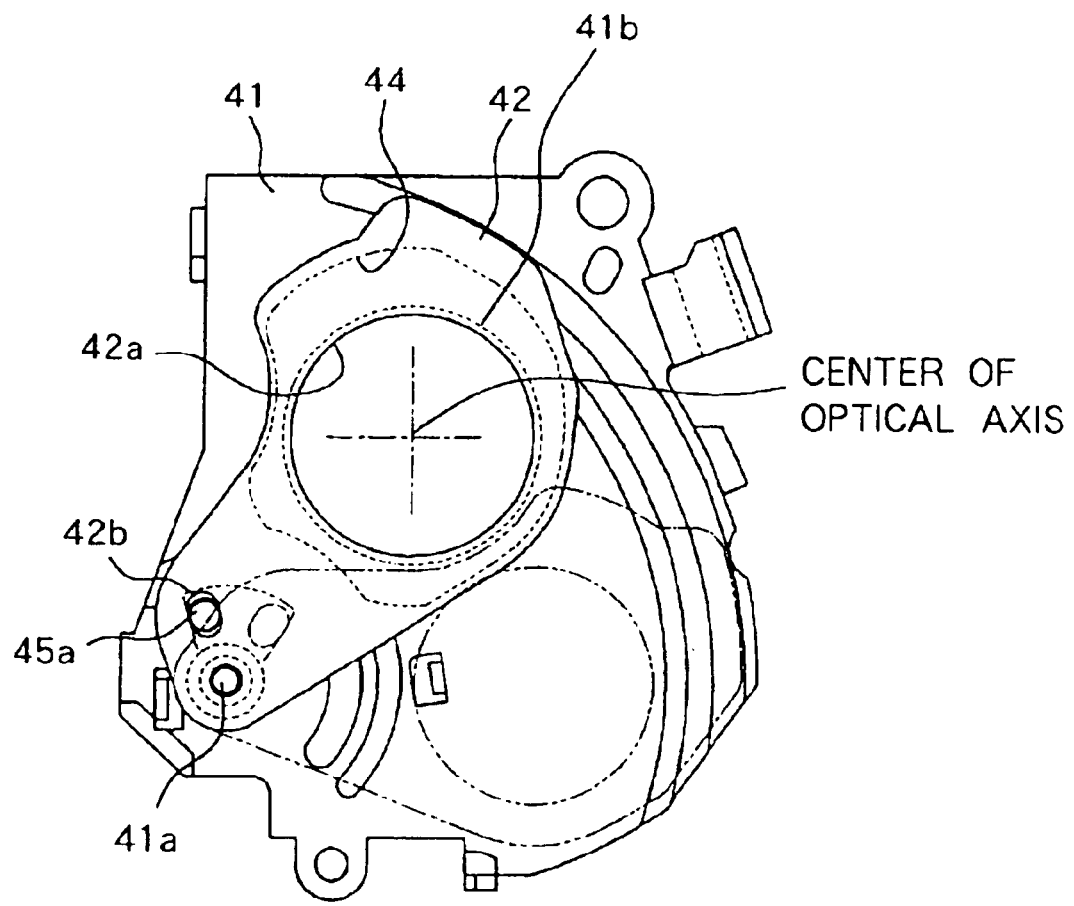
FIG. 6 is a front view of an ND unit in a state where an ND cover is removed.

Then, the structure of the ND unit will be explained using FIG. 6. FIG. 6 is a front view of the ND unit when the ND cover 43 is removed.

In FIG. 6, reference numeral 42a denotes an opening formed in the ND blade 42. Reference numeral 44 denotes an ND filter (shown by a dotted line in the figure) which is attached to the ND blade 42 and covers the opening 42a. Reference numeral 41a denotes a rotation shaft formed on the ND base plate 41 and supports the ND blade 42 in a rotatable manner. Reference numeral 45a denotes a driving pin formed on a rotatable driving lever 45 (see FIG. 7), the driving pin 45a engages with a long hole portion 42b formed in the end side (rotation shaft 41a side) of the ND blade 42.

In the above described structure, when the driving lever 45 rotates, the ND blade 42 rotates around the rotation shaft 41a through the engagement between the driving pin 45a and long hole portion 42b. That is, when the ND blade 42 moves with respect to the opening (shown with a dotted line in FIG. 6) 41b formed in the ND base plate 41, the opening 41b can be covered with the ND filter 44. At this time, the amount of light incident on the image plane is restricted by the action of the ND filter 44. Furthermore, when the ND blade 42 moves to the position shown by a two-dot dashed line in FIG. 6, the ND filter 44 can be moved away from the opening 41b. The stop shutter unit and the ND unit are fixed to the third holding barrel 13 with screws (not shown).

Figure 7:
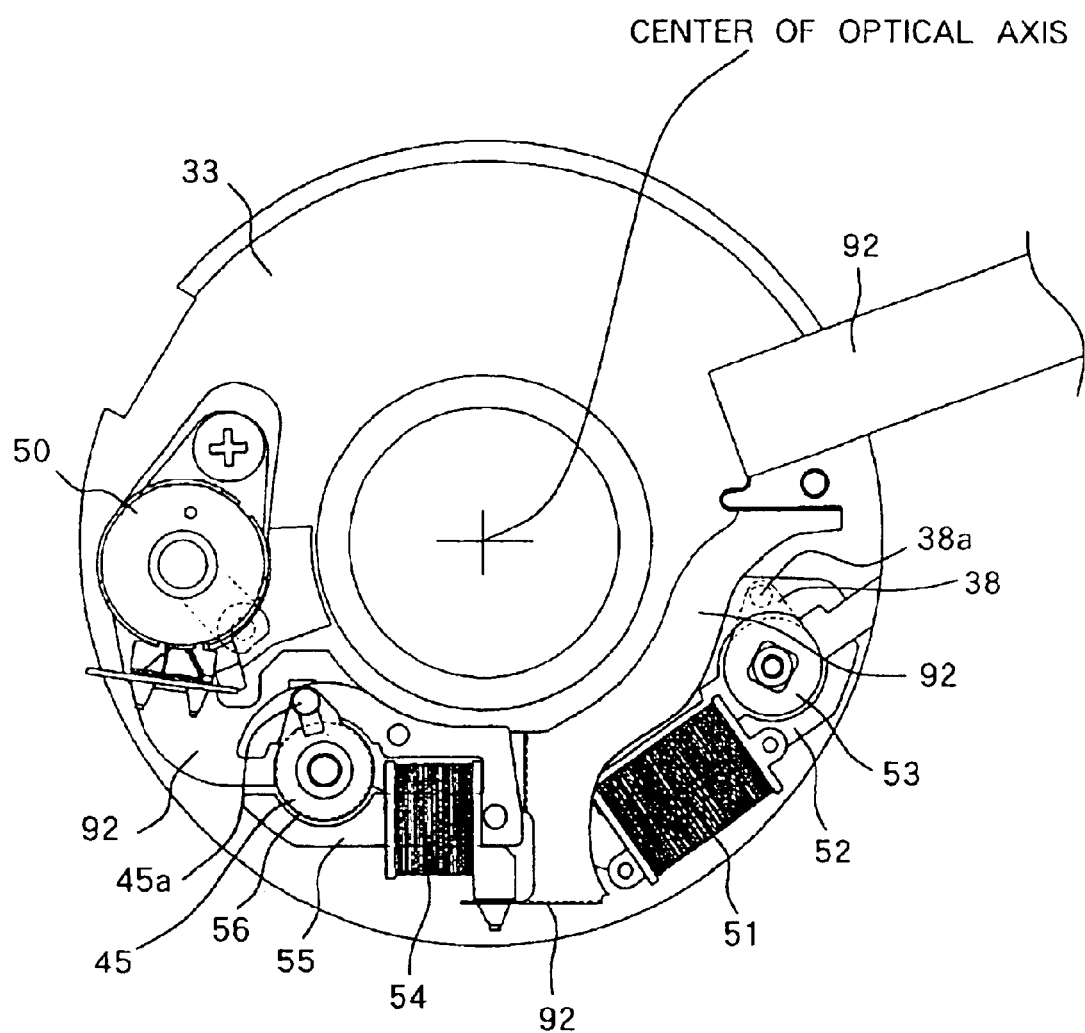
FIG. 7 is a rear view of the stop shutter unit.

Then, the driving unit for driving the stop blade 31, shutter blade 34 and ND blade 42 will be explained using FIG. 7. FIG. 7 is a rear view of a stop shutter unit.

In FIG. 7, reference numeral 50 denotes a stepping motor constituting a driving unit which drives the stop blade 31 and a driving lever 39 is connected to the output shaft of the stepping motor. In this embodiment, the stepping motor 50 is driven in micro steps to perform finer position control and thereby improve the stopping-down accuracy.

Reference numerals 51, 52 and 53 denote a coil, yoke and magnet, respectively which constitute the driving unit which drives the shutter blade 34. The magnet 53 rotates in a predetermined direction through a magnetic force generated when power is supplied to the coil 51. Here since the driving lever 38 is attached to the magnet 53 as an integral part, the driving lever 38 also rotates together with the rotation of the magnet 53.

Reference numerals 54, 55 and 56 denote a coil, yoke and magnet, respectively which constitute the driving unit which drives the ND blade 42. The magnet 56 rotates in a predetermined direction through a magnetic force generated when power is supplied to the coil 54. Here, since the driving lever 45 is attached to the magnet 56 as an integral part, the driving lever 45 also rotates together with the rotation of the magnet 56.

In this embodiment, as shown in FIG. 1, the above described driving units which drive the stop blade 31, shutter blade 34 and ND blade 42 are arranged in the space which is in the periphery of the third lens unit 3 and formed between the stop blade 31 and the ND blade 42.

By arranging the respective driving units using a dead space formed between the stop blade 31 and the ND blade 42, it is possible to shorten (make thinner) the length of the third holding barrel 13 in the direction of the image-taking optical axis. Furthermore, since each driving unit is arranged in substantially the same position in the direction of the image-taking optical axis with respect to the third holding barrel 13, it is possible to shorten wiring of an FPC 92 which supplies power to the stepping motor 50, coils 51 and 54 compared to the case where the driving units are arranged in different positions in the direction of the image-taking optical axis with respect to the third holding barrel 13 and thereby reduce the cost or reduce power loss.

Here, when the three types of blades; stop blade 31, shutter blade 34 and ND blade 42 and the driving units to drive these blades are arranged on one side (object side or image plane side) of the lenses (third holding barrel 13), another movable area for other blades needs to be provided in a area other than the movable area of one of the blades 31, 34 and 42. Thus, it is difficult to reduce the size of the lens barrel because of layout restrictions of a member arranged in the lens barrel.

Thus, in this embodiment, the stop blade 31 and shutter blade 34 are arranged on the object side with respect the third holding barrel 13 (third lens unit 3) and the ND blade 42 is arranged on the image plane side with respect to the third holding barrel 13 (third lens unit 3). A space which serves as the movable areas for three kinds of blades 31, 34 and 42 are formed at both ends of the third holding barrel 13, thereby increases the degree of design freedom in forming the movable areas for the blades 31, 34 and 42 compared to the above described case where three kinds of blades 31, 34 and 42 are arranged together on one side of the third holding barrel 13 and can thereby efficiently arrange the blades and driving units which drive them in the lens barrel taking into account the movable areas of the blades 31, 34 and 42 and repress the size of the lens barrel size from increasing.

In this embodiment, the stop blade 31 and shutter blade 34 are arranged at one end of the third holding barrel 13 and the ND blade 42 is arranged at the other end, but this arrangement (structure) can take any other forms. That is, any one of the stop blade 31, shutter blade 34 and ND blade 42 can be arranged at one end of the third holding barrel 13 and the other blades can be arranged at the other end.

Furthermore, in this embodiment, as shown in FIG. 7, the driving units are arranged on substantially the same circumference centered on the image-taking optical axis. This allows the driving units to be more efficiently arranged in the diameter direction on the lens barrel, compared to the arrangement of the driving units in the diameter direction of the lens barrel, and can thereby reduce the size in the diameter direction of the third holding barrel 13 and reduce the size in the diameter direction of the lens barrel.

Figure 8:
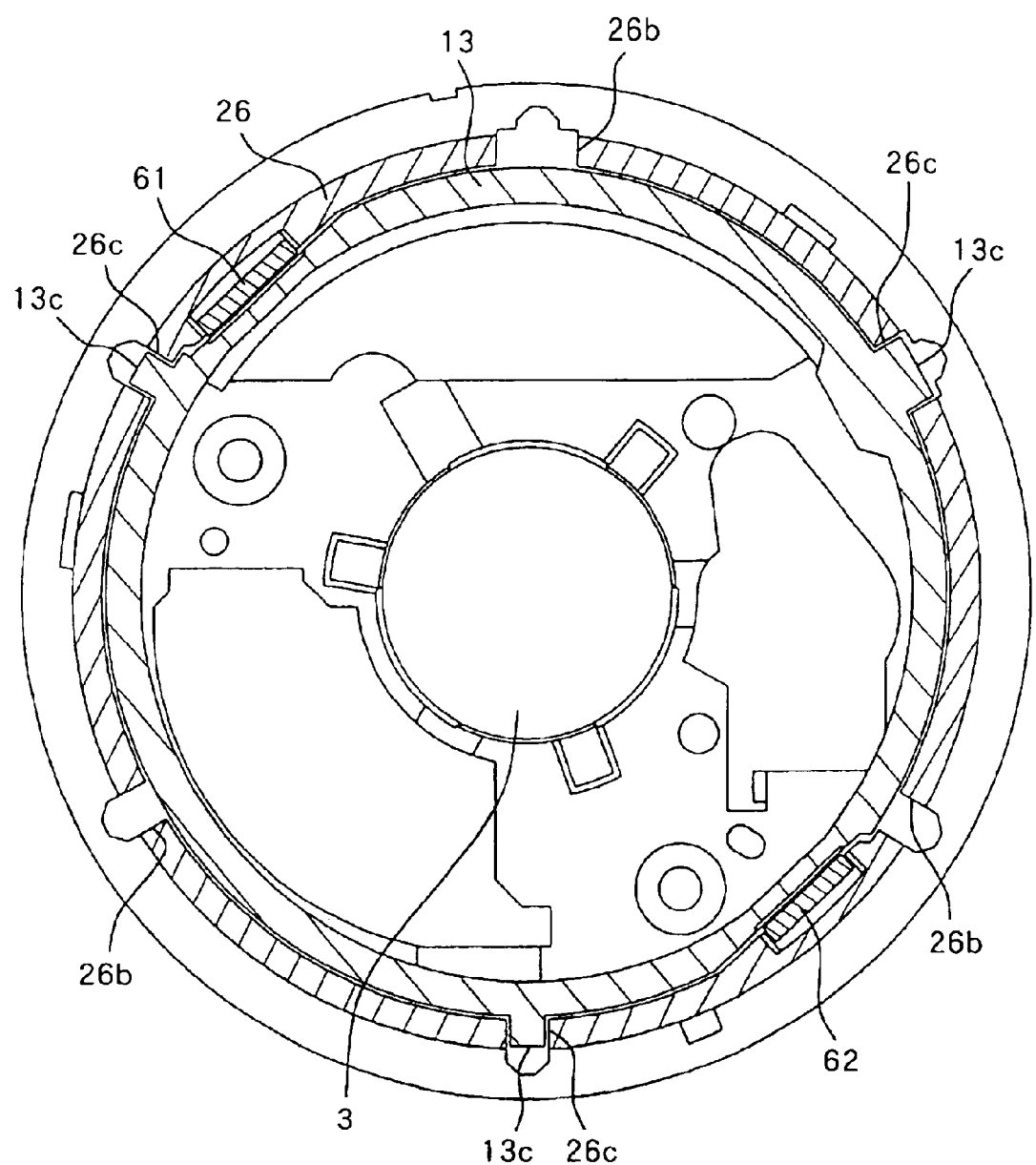
FIG. 8 is a sectional view of the lens barrel along a line A—A in FIG. 1.

Then, FIG. 8 shows a sectional view of the lens barrel along a line A—A in FIG. 1.

In FIG. 8, reference numerals 61 and 62 denote the aforementioned rotation blocking keys. Reference numeral 13c denotes ribs formed on the external surface of the third holding barrel 13 as integral parts, which extend in the direction of the image-taking optical axis. These ribs 13c are fitted in the rectilinear propagation guide groove portion 26c that extends in the direction of the image-taking optical axis and is formed in the rectilinear propagation guide ring 26 with a certain gap. The ribs 13c are provided in three locations (can be any number of locations) in the circumferential direction of the third holding barrel 13 with substantially the same distance.

In this embodiment, the third holding barrel 13 holds the stop shutter unit and the ND unit, and therefore the third holding barrel 13 has large weight. As is apparent from FIG. 1, the center of gravity of the third holding barrel 13 is located distant from the cam follower 13a serving as a support portion of the third holding barrel 13 in the direction of the image-taking optical axis. Because of this, when external shock is given to the lens barrel, the third holding barrel 13 is tilted with respect to the image-taking optical axis, which may cause the cam follower 13a to come off the cam groove portion of the movable cam ring 21.

In this embodiment, because a sufficient clearance is provided between the ribs 13c and the rectilinear propagation guide groove portion 26c of the rectilinear propagation guide ring 26, when the lens barrel is driven, the ribs 13c do not contact the rectilinear propagation guide groove portion 26c and do not constitute any driving load on the lens barrel due to frictional resistance between the ribs 13c and the rectilinear propagation guide groove portion 26c. On the other hand, the ribs 13c extending in the direction of the image-taking optical axis are fitted in the rectilinear propagation guide groove portion 26c of the rectilinear propagation guide ring 26 so that when the third holding barrel 13 is tilted by external shook, the ribs 13c contact the end surface of the rectilinear propagation guide groove portion 26c to prevent the third holding barrel 13 from tilting.

In this embodiment, the ribs 13c are formed in the third holding barrel 13 which has large weight and the third holding barrel 13 is prevented from tilting through the contact between the ribs 13c and the rectilinear propagation guide groove portion 26c, but it is also possible to form the above described ribs in other holding barrels 11, 12 and 14 to prevent these holding barrels from tilting.

Figure 10:
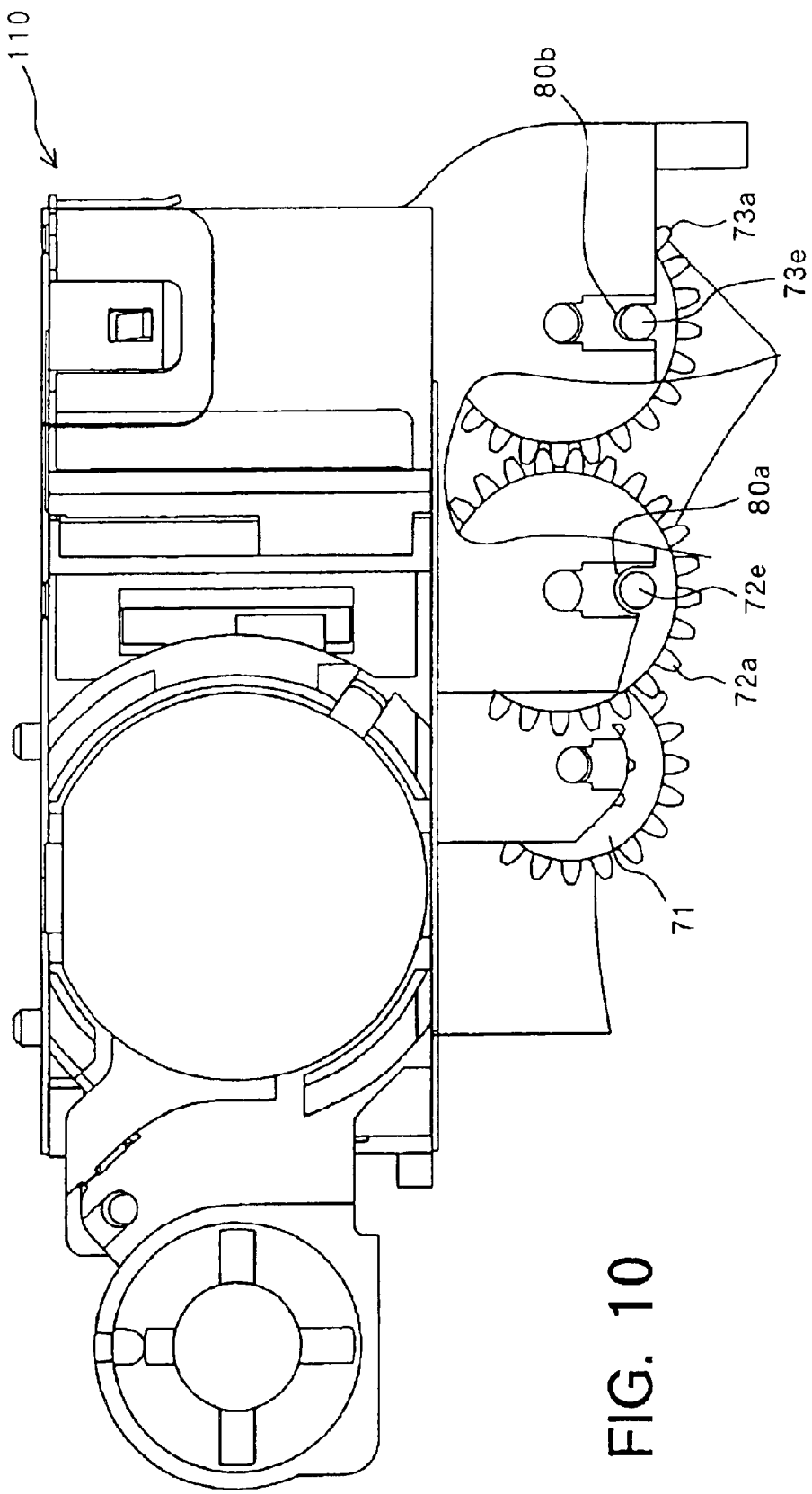
FIG. 10 is a rear view of the finder unit in a state viewed from the ocular side.
Figure 11:
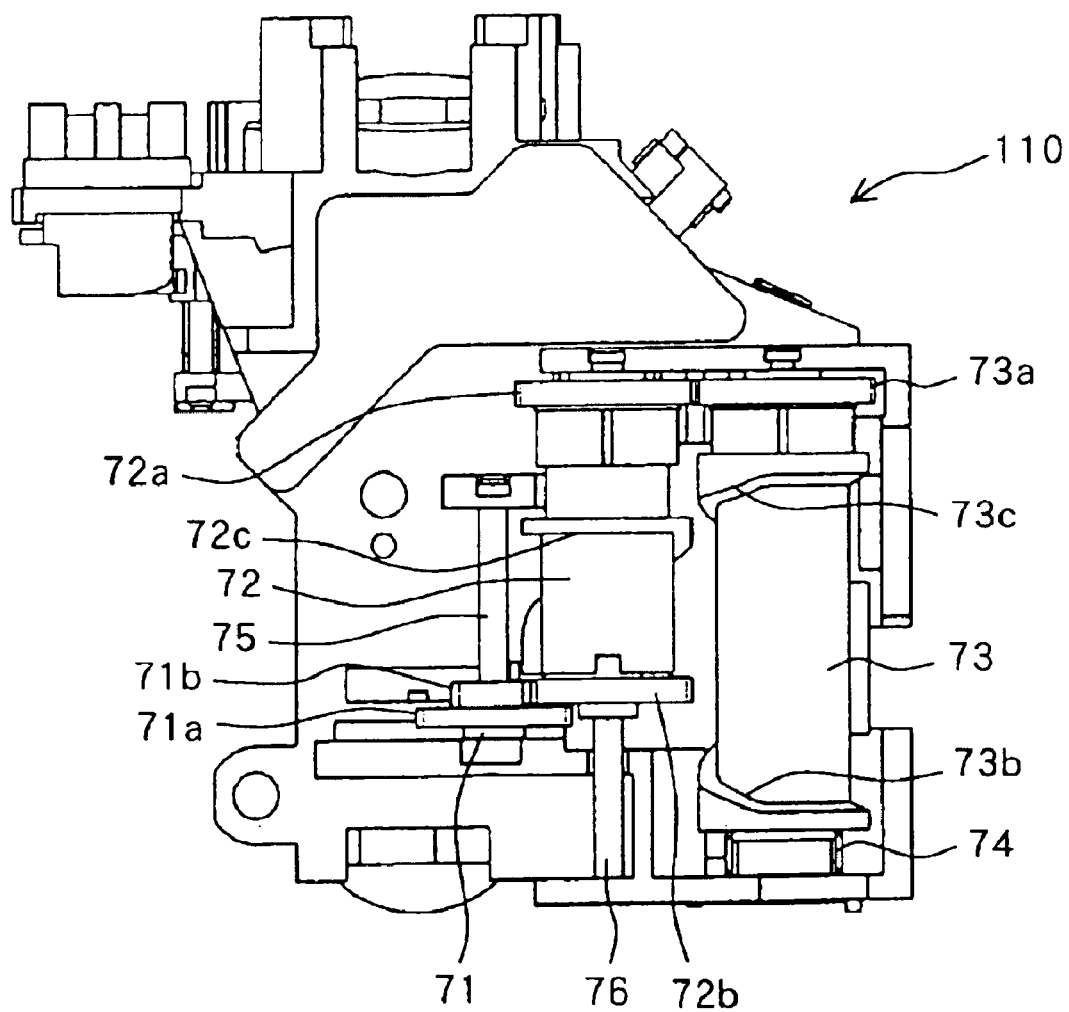
FIG. 11 is a figure of the finder unit in a state viewed from below.
Figure 12:
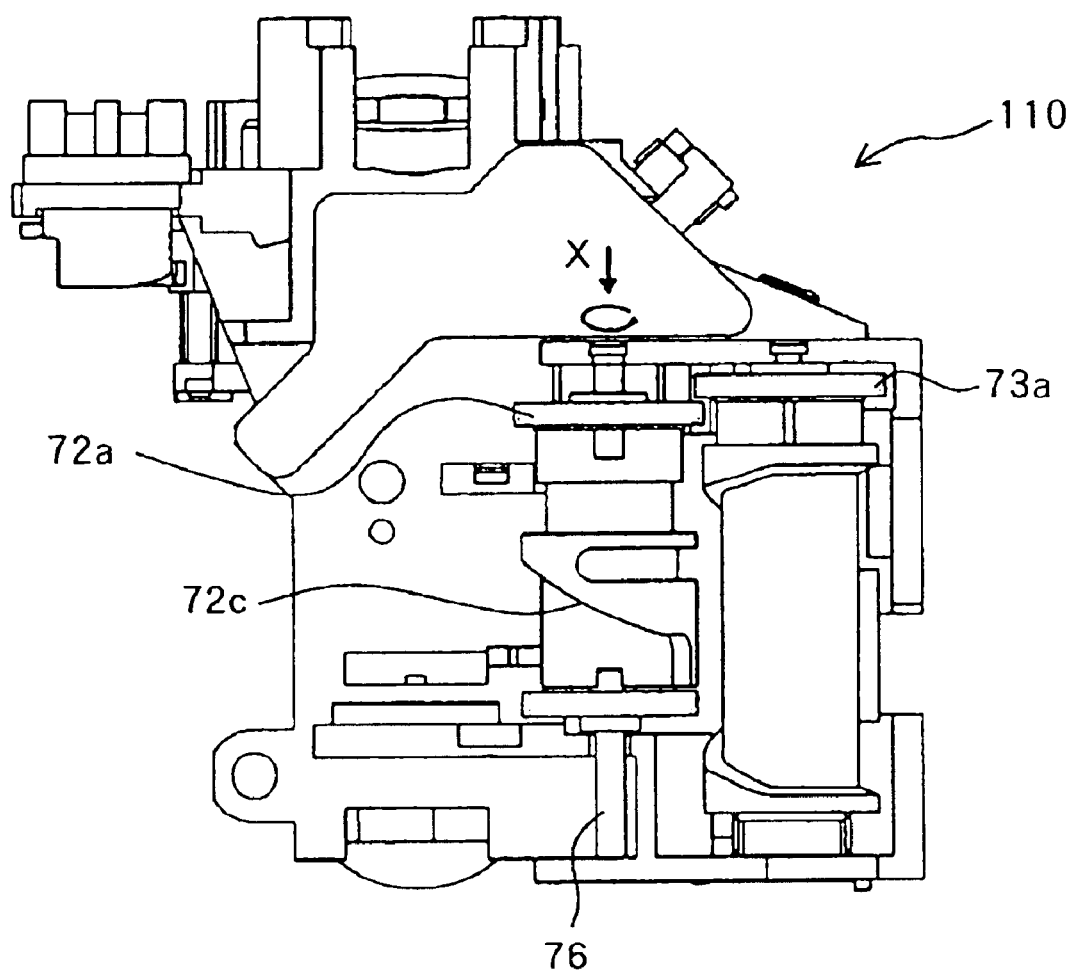
FIG. 12 is a figure of the finder unit in a state viewed from below.
Figure 13:
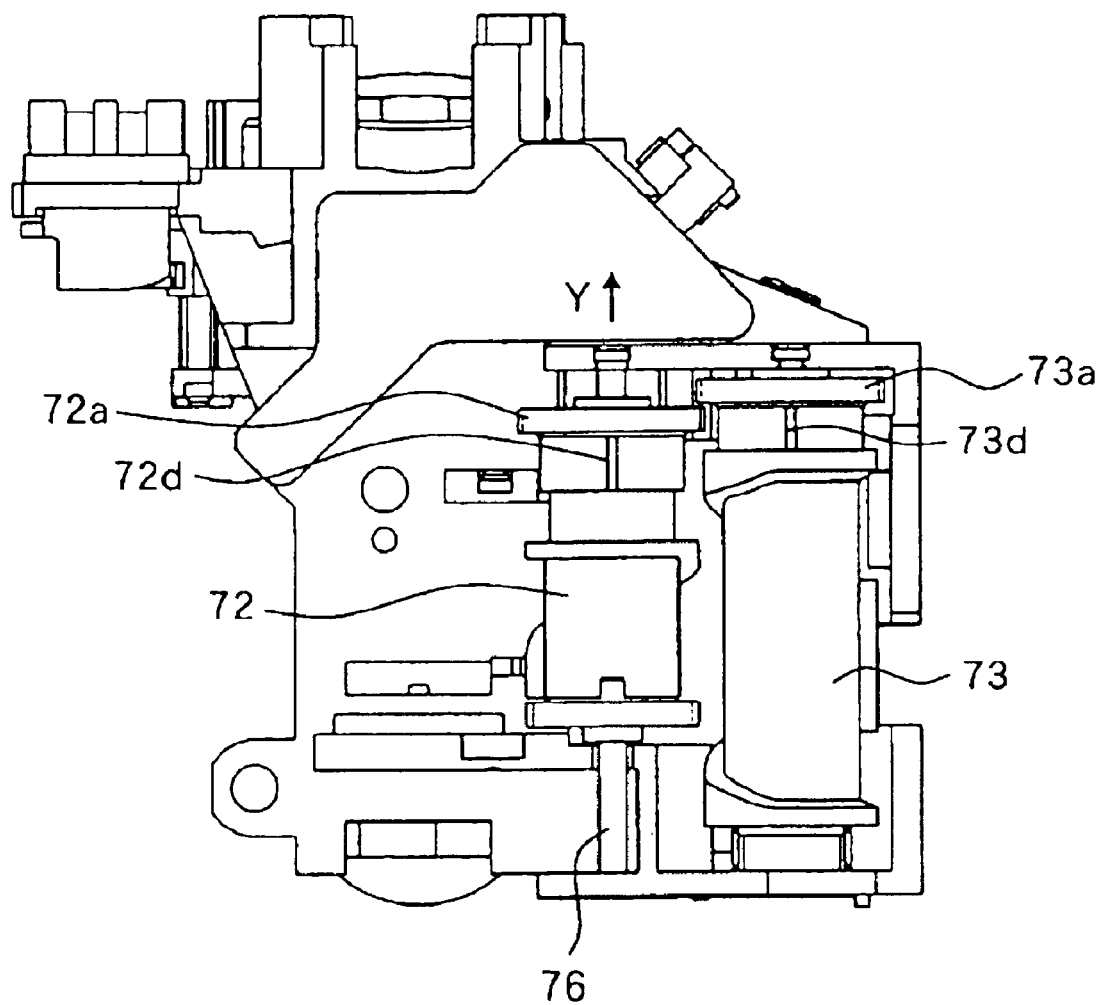
FIG. 13 is a figure of the finder unit in a state viewed from below.
Figure 14:
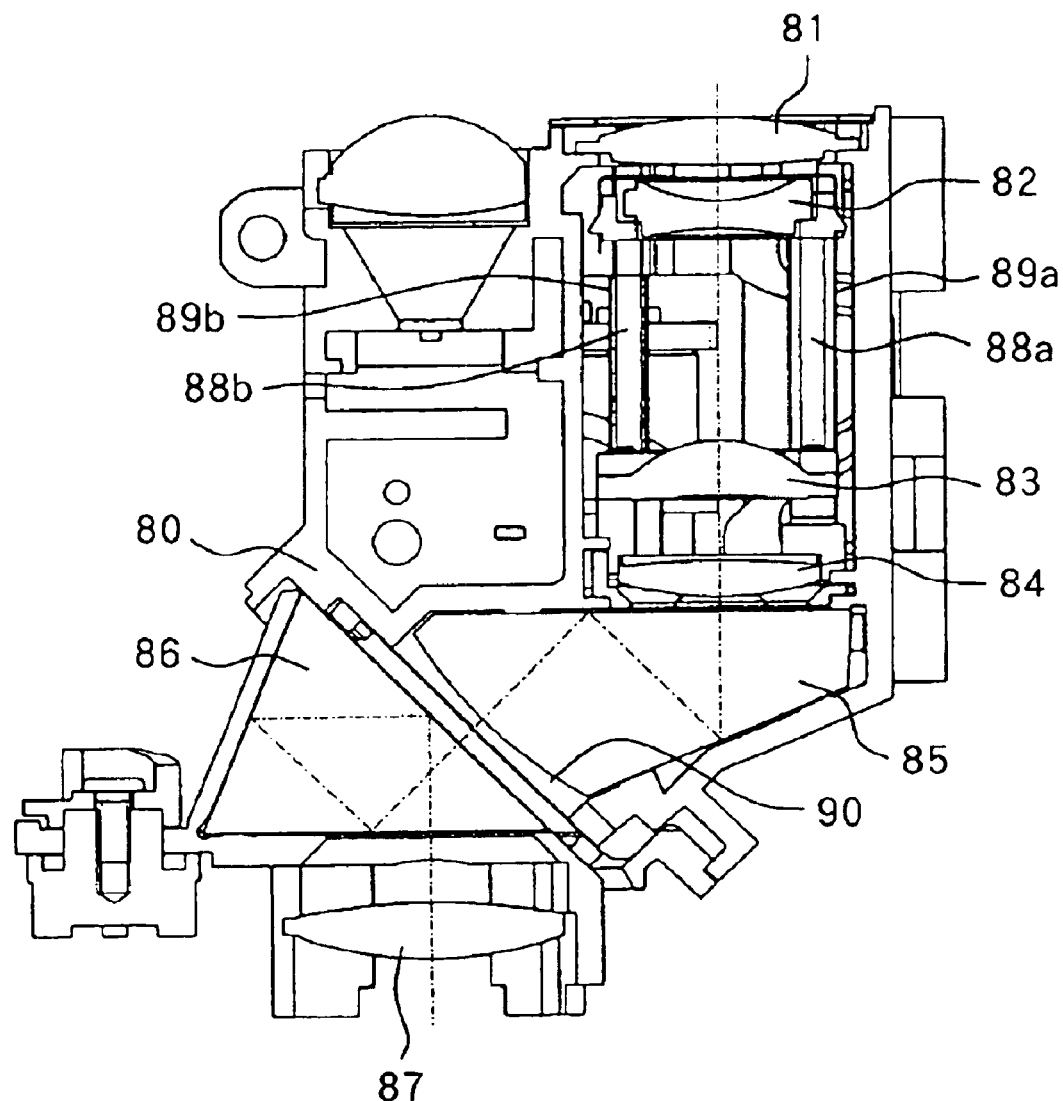
FIG. 14 is a sectional view of the finder unit in a state of cutting off the horizontal plane including the finder optical axis.

Next, the structure of the finder unit 110 is described with refference to FIG. 10 to FIG. 14. Here, FIG. 10 is a rear view of the finder unit 110 viewed from the ocular side, and FIG. 11 to FIG. 13 are bottom views of the finder unit 110 viewed from below. FIG. 14 is a sectional view of the finder unit 110 at cut off of the horizontal plane including the finder optical axis.

Reference numeral 80 denotes a finder base and an objective G1 lens 81 is fixed to the finder base 80. Reference numerals 82, 83, and 84 denote respectively an objective G2 lens, an objective G3 lens and an objective G4 lens, which are supported by two guide bars 88a and 88b as shown in FIG. 14 and a guide bar acting as a rotation stopper (not shown) and movable in the direction of the optical axis.

Light from an object (upper side in FIG. 14) enters into the objective G1 lens 81, repeats refraction between the objective G1 lens 81 and the objective G4 lens 84, and reflects on a prism 85. The reflected light forms an image on a surface where a view frame 90 is formed, and the light reflects repeatedly on a prism 86 and then is guided into an eyepiece lens 87. By these processes, a photographer is able to observe an object by viewing the eyepiece lens 87.

The eyepiece lens 87 is held in the movable state in the direction of the finder optical axis, thus the diopter scale can be adjusted by the eyepiece lens 87 moving in the direction of the optical axis.

As explained above, the objective G2 lens 82 and the objective G4 lens 84 are supported by a guide bar 88a. A compression spring 89a is positioned between the objective G2 lens 82 and the objective G4 lens 84 on the guide bar 88a. The compression spring 89a energizes the objective G2 lens 82 to the object side (to the side of the objective G1 lens 81), and also energizes the objective G4 lens 84 to the ocular side (to the prism 85). As shown in FIG. 11, a cam ring 73 for allowing the objective G2 lens 82 and the objective G4 lens 84 to move in the direction of the optical axis is positioned immediately below the guide bar 88a, and the cam ring 73 is positioned closer to the ocular side by receiving an energizing force of the compression spring 74.

As described later, the objective G2 lens 82 and the objective G4 lens 84 are provided with the cam pins 82a and 84a. These cam pins 82a and 84a abut the cams 73b and 73c of the cam ring 73 by an energizing force of the compression spring 89a. Herein, when the cam ring 73 rotates, the cam pins 82a and 84a are guided by the cams 73b and 73c, thereby the objective G2 lens 82 and the objective G4 lens 84 move in the direction of the optical axis.

As described above, the objective G3 lens 83 is supported by the guide bar 88b. A compression spring 89b is positioned between the objective G3 lens 83 and the finder base 80 on the guide bar 88b. The compression spring 89b energizes the objective G3 lens 83 to the ocular side (side of the prism 85).

As shown in FIG. 11, a cam ring 72 for allowing the objective G3 lens 83 to move in the direction of the optical axis is positioned immediately below the guide bar 88b. As described later, the objective G3 lens 83 is provided with the cam pin 83a and pressed contact to a cam 72c of the cam ring 72 by an energizing force of the helical compression spring 89b. Herein, when the cam ring 72 rotates, the cam pin 83a is guided by the cam 72c, thereby the objective G3 lens 83 moves in the direction of the optical axis.

Herein, the cam ring 72 is compressed by the objective G3 lens 83 energized by the helical compression spring 89b, thereby the cam ring 72 is positioned closer to the ocular side.

Figure 15:
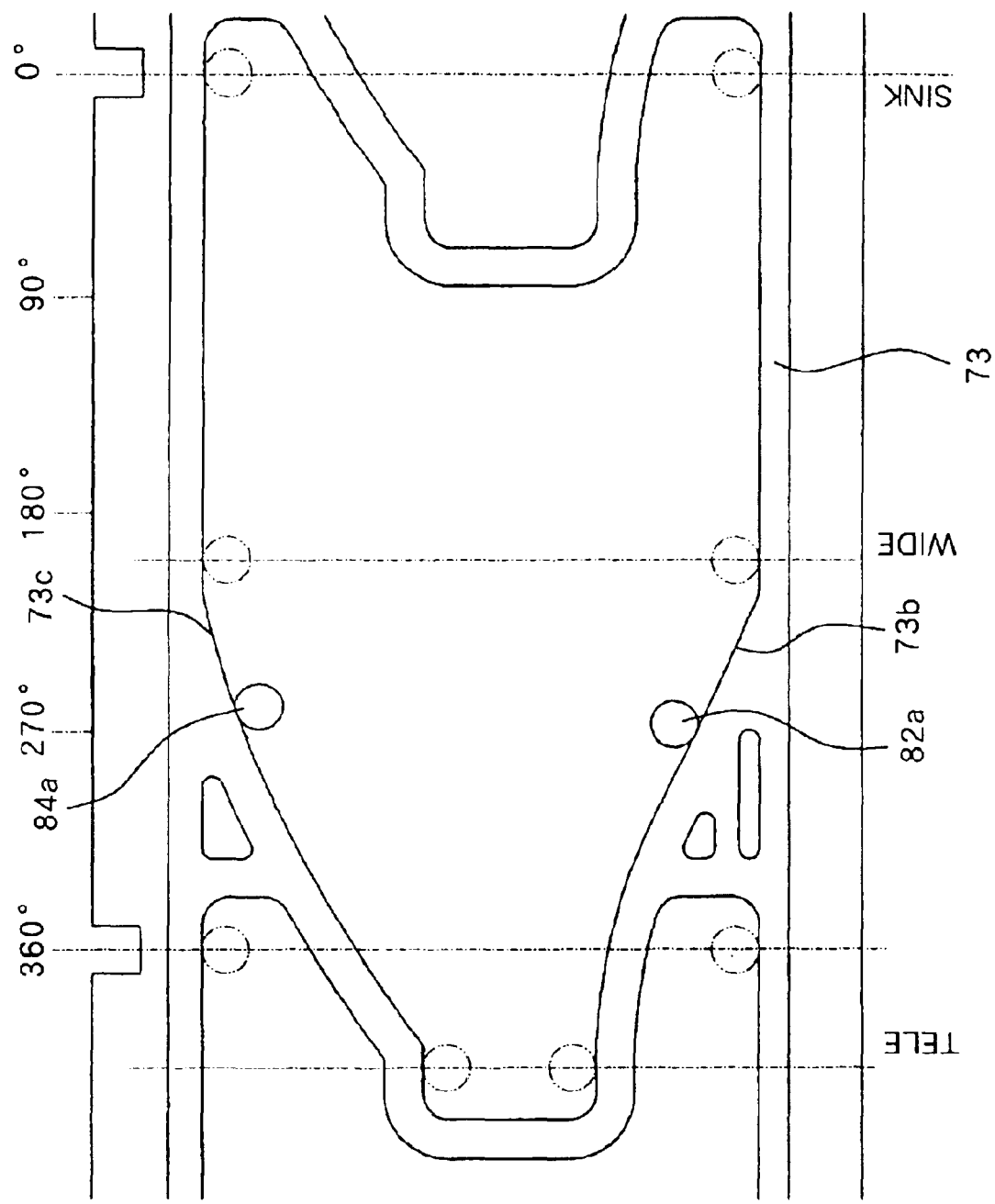
FIG. 15 is a development view of a cam ring that drives an objective G2 lens and an objective G4 lens.
Figure 16:
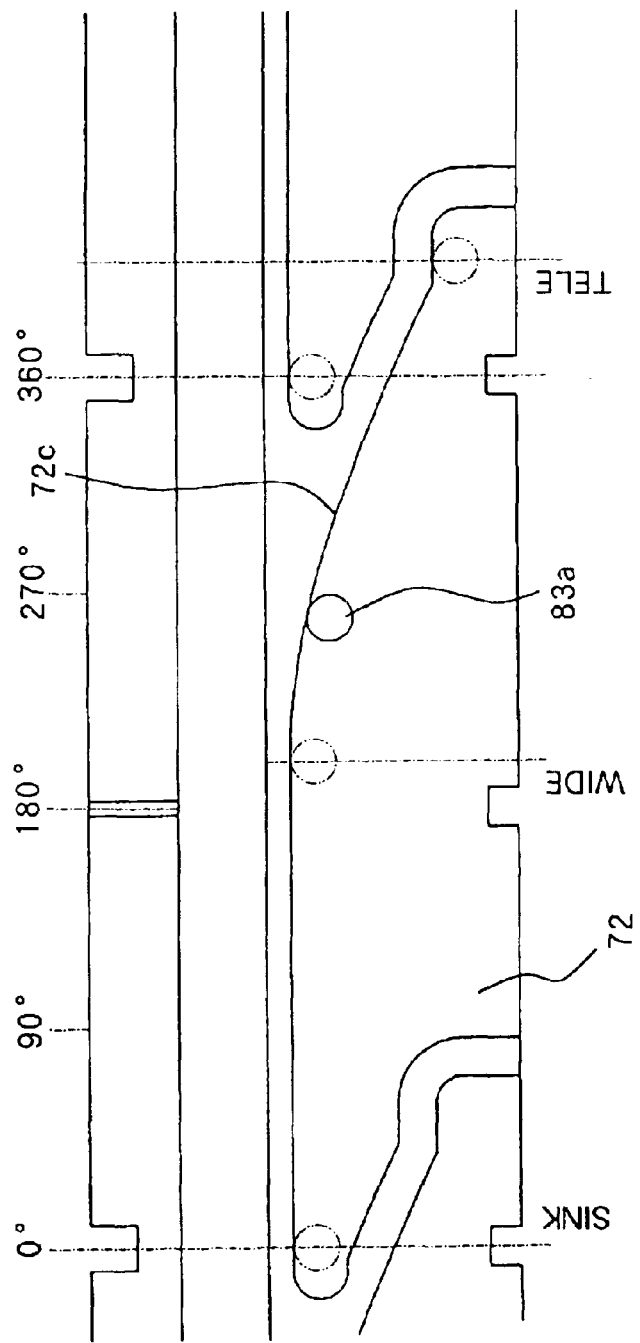
FIG. 16 is a development view of a cam ring that drives an objective G3 lens.

FIG. 15 shows a development view of the cam ring 73 and FIG. 16 shows a development view of the cam ring 72. In FIG. 15, reference numeral 82a denotes a cam pin formed on the objective G2 lens 82, and reference numeral 84a denotes a cam pin formed on the objective G4 lens 84. In FIG. 16, reference numeral 83a denotes a cam pin formed on the objective G3 lens 83.

When the cam pins 82a, 83a, and 84a move respectively along the cams 73b, 72c, and 73c, three objective lenses 82, 83, and 84, move respectively in a predetermined distance in the direction of the optical axis, thereby zooming of a finder optical system is carried out.

Herein, when the objective lenses 82, 83, and 84 are driven by means of the cams, the cam ring 72 and the cam ring 73 rotate mutually in an opposite direction. Therefore, as shown in FIG. 15 and FIG. 16, the cam 72c of the cam ring 72 and the cams 73b and 73c of the cam ring 73 are structured, so that the right and left face in the opposite direction.

In the finder unit with the above described structure, the rotation of the cam rings 72 and 73 allows the objective lenses 82, 83 and 84 to move in the direction of the optical axis to carry out zooming, the phases of the cam ring 73 and cam ring 72 must be in alignment in order to drive the objective lenses 82, 83 and 84 in such a manner to meet optical conditions.

It is designed that the cam rings 72 and 73 are driven by a rotational force from the gear train 71 arranged in the finder unit 110. The gear train 71 is supported on the finder base 80 through the gear shaft 75 in a rotatable manner. A small gear 71b of the gear train 71 engages with the gear 72b which is mounted on one end of the cam ring 72 and rotates integrally with the cam ring 72. The gear 72b can rotate the cam ring 72 by receiving the rotational force from the small gear 71b. Herein, the gear 72b and the cam ring 72 are supported on the finder base 80 through the camshaft 76 in a rotatable manner.

A gear 72a is mounted on the other end of the cam ring 72, and rotates integrally with the cam ring 72. The gear 72a engages with the gear 73a which is mounted on one end of the cam ring 73, and rotates Integrally with the cam ring 73, thereby the rotation force of the gear 72a is transmitted to the gear 73a, resulting in rotation of the cam ring 73.

Next, a method for assembling the finder unit 110 mentioned above will be described.

First, the objective lenses 81 through 84, the compression springs 89a, 89b, and 74 and the guide bars (including the guide bars 88a and 88b) are incorporated into the finder base 80, and then the cam rings 72 and 73 are incorporated therein. Herein, the objective G2 lens 82 is positioned closer to the object side, whereas the objective G3 lens 83 and the objective G4 lens 84 are positioned closer to the ocular side by the energizing force of the compression springs 89a and 89b.

The cam pins 82a, 83a, and 84a of the objective lenses 82, 83, and 84 abut the linear area from SINK (in a collapsed state) to WIDE in cams 73b, 72c, and 73c as shown in FIG. 15 and FIG. 16. Thus, when the phases of the cam ring 72 and the cam ring 73 are in alignment so that the cam pins 82a, 83a, and 84a are positioned within the area from SINK to WIDE in the cams 73b, 72c, and 73c, the cam pins 82a, 83a and 84a can be incorporated into the cams 73b, 72c, and 73c. Herein, since the area from SINK to WIDE among the cams 73b, 72c, and 73c is formed in a substantially large size (in a range of 180 degrees in the circumferential direction of the cam rings 72 and 73), the cam pins 82a, 83a and 84a can be easily incorporated into the cams 73b, 72c, and 73c respectively.

FIG. 12 and FIG. 13 are drawings for explaining how to align the phase of two cam rings 72 and 73.

In a state prior to the gear train 71 being incorporated into the finder base 80, the cam ring 72 can be moved in the direction of the optical axis along the camshaft 76. When the cam ring 72 is positioned closer to the ocular side (direction of arrow Y in FIG. 13) from a state shown in FIG. 13, the gear 72a engages with the gear 73a, as shown in FIG. 10 and 11. On the other hand, when the cam ring 72 is moved to the object side (direction of arrow X in the FIG. 12) from a state that the gear 72a engages with the gear 73a, the gear 72a and gear 73a can be disengaged.

As explained above, in a state prior to the gear train 71 being incorporated into the finder base 80, the gear 72a mounted integrally with the cam ring 72 and the gear 73a mounted integrally with the cam ring 73 are out of alignment in the engagement phase.

Herein, the groove portions 72d and 73d provided on a part of two cam rings 72 and 73 respectively as shown in FIG. 13 can be used as a mark for alignment of the phase, where the phase of the cam ring 72 is aligned with the phase of the cam ring 73. More specifically, the phase of two cam rings 72 and 73 can be easily aligned by allowing the gear 72a to engage with the gear 73a so that the plane containing the rotating shaft of the cam ring 72 and the groove portion 72d is positioned parallel to the plane containing the rotating shaft of the cam ring 73 and the groove portion 73d.

Further, as shown in FIG. 10, the gears 72a and 73a are provided with apertures 72e and 73e respectively and the plate of the finder base 80 is provided with the groove portions 80a and 80b, thereby making it possible to align the phase of the cam ring 72 with the phase of the cam ring 73 by using the groove portions 80a and 80b as a mark for alignment of the phase. More specifically, the phase of the cam ring 72 can be aligned with the phase of the cam ring 73 on the basis of the groove portions 80a and 80b by making the apertures 72e and 73e visible through the groove portions 80a and 80b of the finder base 80 only when the gears 72a and 73a are aligned in a predetermined phase.

Thereafter, the gear train 71 is incorporated into the finder base 80 together with the gear shaft 75, to complete assembling of the finder unit 110. Herein, since the gear portion 72b is pressed by the large gear 71a of the gear train 71, the cam ring 72 is positioned in the direction of the optical axis. Thus, disengagement of the gear 72a from the gear 73a can be prevented, and the cam ring 72 is not out of alignment with the cam ring 73 in the engagement phase, after assembling of the finder unit 110 is completed.

Where the finder unit 110 with the above structure is incorporated into the lens barrel 101, when the cam ring 72 and the cam ring 73 are aligned at a predetermined phase (for example, SINK state in FIG. 15 and 16), the phase of the large gear 71a is determined, because the small gear 71b of the gear train 71 engages with the gear 72b. When the large gear 71a engages with the outer circumferential gear portion 25c of the driving ring 25 which is aligned at a predetermined phase (for example, in a collapsed state), the finder unit 110 can be coupled to the lens barrel 101, thereby allowing zooming in the image-taking optical system in conjunction with zooming in the finder optical system.

According to the camera of the embodiment of the present invention, forming the outer circumferential gear portion 25c and the inner circumferential gear portion 25a at a different position in the direction of the image-taking optical axis makes it possible to set the thickness of the driving ring 25 to such a thickness that allows one gear (inner circumferential gear portion 25a or outer circumferential gear portion 25c) to be formed and reduce the thickness of the driving ring 25 compared to a case where the inner circumferential gear portion 25a and the outer circumferential gear portion 25c are formed at the same position in the direction of the image-taking optical axis.

The member placed outside of the lens barrel (driving ring 25) can be positioned closer to the side of the lens barrel by the reduced thickness of the driving ring 25, thereby downsizing of the camera can be brought about. As described in the embodiment of the present invention, in the structure in which the finder unit is driven in conjunction with the driving of the lens barrel, the finder unit and the lens barrel can come close to each other by the reduced thickness of the driving ring 25, thus it is possible to reduce the size of a camera.

Further, allowing the finder unit and the lens barrel to come close to each other can shorten the distance between the finder optical axis and the image-taking optical axis, thus parallax can be made smaller.

What is claimed is:

1. A camera comprising,
   an actuator,
   a finder driving unit that drives a finder optical system, and
   a driving member which rotates around the image-taking optical axis by the driving force from the actuator and transmits the driving force to the finder driving unit,
   wherein two gears are formed integrally on the outer and inner circumferences of the driving member, of these two gears, a first gear is interconnected to the actuator and a second gear is interconnected to the finder driving unit, and
   the two gears are formed at different positions in the direction of the image-taking optical axis.

2. The camera according to claim 1,
   wherein the distance between the image-taking optical axis and the bottom of the second gear is equal to or shorter than the distance between the image-taking optical axis and the bottom of the first gear.

3. The camera according to claim 1,
   wherein the finder driving unit is positioned outside of the driving member.

4. A camera comprising:
   an actuator,
   an external member driving unit that drives an external member not positioned in an image-taking optical path, and
   a driving member which rotates around the image-taking optical path by the driving force from the actuator and transmits the driving force to the external member driving unit,
   wherein two gears are formed integrally on the outer and inner circumferences of the driving member, of these two gears, a first gear is interconnected to the actuator and a second gear is interconnected to the external member driving unit, and
   the two gears are formed at different positions in the direction of the image-taking optical path.

* * * * *